US005701258A

United States Patent [19]

Harris et al.

[11] Patent Number: 5,701,258

[45] Date of Patent: Dec. 23, 1997

[54] WIRELESS PAGER WITH PRESTORED IMAGES AND METHODS AND SYSTEMS FOR USE THEREWITH

[75] Inventors: Daryl Robert Harris, Evanston; Shrirang Nilkanth Jambhekar; William Louis Reber, both of Schaumburg; Bruce Edward Stuckman, Algonquin, all of Ill.; Cary Drake Perttunen, Shelby Township, Mich.

[73] Assignee: Motorola, Inc., Schaumburg, Ill.

[21] Appl. No.: 366,156

[22] Filed: Dec. 29, 1994

[51] Int. Cl.[6] .................... H04Q 7/00; G08B 5/22

[52] U.S. Cl. .................... 364/514 R; 340/825.44

[58] Field of Search .................... 364/514 R; 340/825.44, 340/825.45, 825.46, 825.47, 825.48; 379/57; 455/38.4

[56] References Cited

U.S. PATENT DOCUMENTS

| | | | |
|---|---|---|---|
| 4,336,524 | 6/1982 | Levine | 340/311.1 |
| 4,951,039 | 8/1990 | Schwendeman et al. | 340/725 |
| 5,087,905 | 2/1992 | Kuramatsu et al. | 340/311.1 |
| 5,173,688 | 12/1992 | DeLuca et al. | 340/825.44 |
| 5,412,719 | 5/1995 | Hamamoto et al. | 380/9 |
| 5,539,529 | 7/1996 | Merchant | 358/400 |

*Primary Examiner*—Emanuel T. Voeltz
*Assistant Examiner*—Tony M. Cole
*Attorney, Agent, or Firm*—Bruce E. Stuckman; Jeffrey G. Toler

[57] ABSTRACT

A message is formed by capturing at least one image of an individual, and producing a first signal representative thereof. A signal is transmitted based upon both the first signal and a second signal which indicates a selected image from a plurality of predetermined images. The message is reconstructed from a received radio frequency signal which contains a third signal representative of the at least one image of the individual and a fourth signal indicative of the selected image. The selected image is retrieved from a plurality of prestored images based upon the fourth signal. At least one combined image is displayed based upon the at least one image of the individual, provided by the third signal, and the selected image.

34 Claims, 3 Drawing Sheets

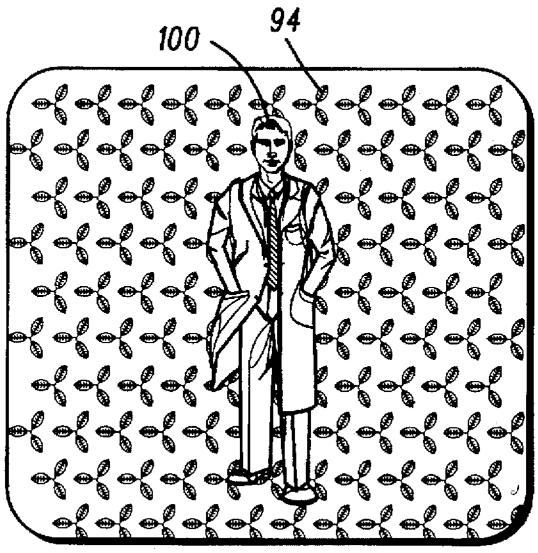
FIG. 8
FIG. 9
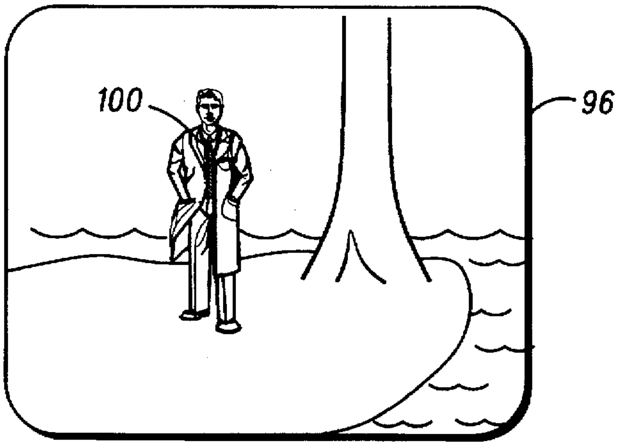
FIG. 10
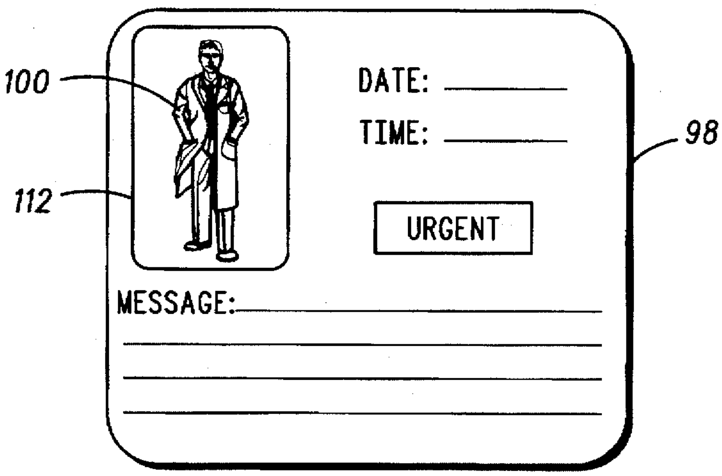

WIRELESS PAGER WITH PRESTORED IMAGES AND METHODS AND SYSTEMS FOR USE THEREWITH

TECHNICAL FIELD

The present invention relates to a selective call receiver, such as a wireless pager, capable of displaying an image based upon a received signal.

BACKGROUND OF THE INVENTION

The use of selective call receivers, such as wireless pagers, is becoming increasingly popular in both personal and business applications. Many currently-available commercial pagers produce either an audio signal or a vibration signal to alert a user of an incoming message. In addition to an alerting signal, many pagers are capable of receiving radio frequency signals representative of a numerical message. These pagers further include a display device capable of displaying the numerical message. This allows a party paging the user to send a return telephone number, for example, directly to the wireless pager.

Other commercially-available pagers are capable of receiving radio frequency signals representative of an alphanumerical message, and displaying the alphanumerical message on a display device. This allows a party paging the user to send a brief text-based message directly to the wireless pager. As a result, pagers with an alphanumeric display provide an improved personalization of an incoming message in comparison to the numerical display.

Other wireless pager systems have been disclosed which provide further personalization of a message received thereby. For example, U.S. Pat. No. 5,087,905, to Kuramatsu et al., discloses a radio pager which receives a series of data transmissions and provides a display image based thereupon. In particular, data contained in a second and subsequent ones of the data transmissions is superimposed on basic data contained in a first of the data transmissions in order to form the display image. A read-only memory is provided for storing a plurality of predetermined patterns, wherein a selected one of the predetermined patterns is displayed in dependence upon the basic data in the first of the data transmissions.

U.S. Pat. No. 5,173,688, to DeLuca et al., discloses a pager capable of receiving data representative of a blank form or table and producing a display based thereupon. Further, the pager is capable of filling in the displayed form or table based upon a subsequently received signal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 6–10 schematically illustrate examples of combined images in accordance with embodiments of the present invention.

DETAILED DESCRIPTION OF A PREFERRED EMBODIMENT

Embodiments of the present invention advantageously form visual messages for a wireless pager based upon both an image produced by an individual sending a visual message, and a selected one of a plurality of prestored images. A significant improvement in the personalization of messages transmitted to a wireless pager is realized by incorporating the image produced by the individual, and by providing a variety of prestored images from which the selected one is chosen. The prestored images may be utilized in characterizing the nature of the message in applications such as paging, greetings, and visual mail.

Figure 1:
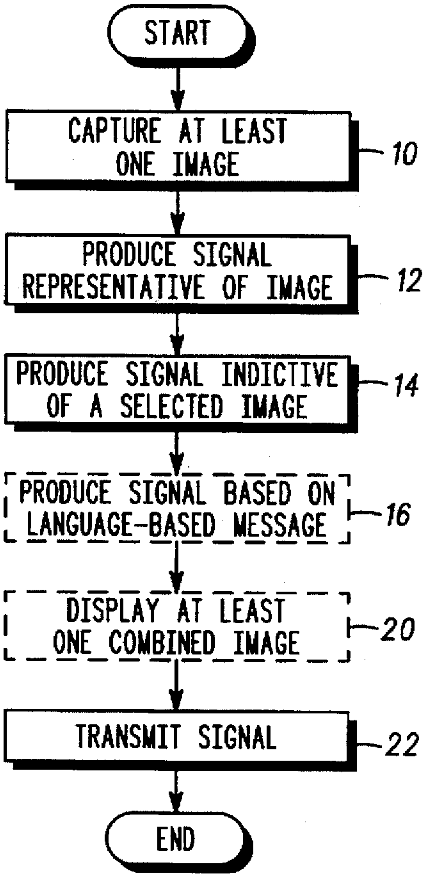
FIG. 1 is a flow chart of an embodiment of a method of forming a message for transmission to a wireless pager.

FIG. 1 is a flow chart of an embodiment of a method of forming a message for transmission to a wireless pager. The method includes a step of capturing at least one image produced by an individual, as indicated by block 10. The at least one image preferably contains the face of the individual sending the message, although embodiments of the present invention are not limited thereto. The at least one image may comprise a single still image produced by the individual. Alternatively, the at least one image may comprise a sequence of images which, when viewed in succession, provide an animated display.

The method further comprises a step of producing a first signal representative of the at least one image, as indicated by block 12. Preferably, the first signal is either an analog or a digital representation of pixels which comprise the at least one image produced by the individual. If the first signal is to be in a digital form, the step of producing the first signal may include steps such as digitizing the at least one image and encoding an at least one digitized image which results. Further, the first signal in the digital form may be compressed in order to reduce a number of bits required to represent the at least one image. For a sequence of images, various inter-frame compression techniques known in the art of image processing may be employed.

Optionally, the step of producing the first signal representative of the at least one image includes a step of segmenting the at least one image to extract a predetermined object therefrom. As known in the art of image processing, segmenting an image entails subdividing the image into at least one object, wherein an object is representative of a constituent part of the image, a region of the image, or another entity of interest in the image. Preferably, the predetermined object extracted from the at least one image includes a portion of the individual, such as the individual's face. By including a step of segmenting, the first signal provides an encoded representation of the predetermined object rather than the entire image. Various techniques for segmentation may be employed in this step, as one with ordinary skill in the art of image processing will recognize.

As indicated by block 14, the method further includes a step of producing a second signal which indicates a selected image from a plurality of predetermined images. Typically, the selected image is determined based upon a series of keystrokes initiated by the same individual whose image is captured in the step of block 10. The plurality of predetermined images preferably includes one or more clip art images, examples of which are illustrated hereinafter. The selected image is used by the wireless pager which receives the message, in a manner to be described later, to personalize the at least one image produced by the individual.

The second signal need not be an analog or a digital representation of each of the pixels of the selected image. Rather, the second signal is preferably a designator of the selected image from the plurality of predetermined images. More particularly, each of the plurality of predetermined images is uniquely represented by a corresponding designator. Preferably, the designator for each of the predetermined images comprises a unique series of digital bits.

Optionally, the method may further include a step of producing a third signal in dependence upon a language-based message, as indicated by block 16. The language-based message may be either an audio message, an alphanumeric message, or a combination thereof. The language-based message provides a systematic means of communicating, to the user of the wireless pager, ideas or feelings using conventionalized sounds, signs, or marks having understood meanings.

An audio message in accordance with this step is formed by at least one received acoustic pressure wave. Hence, the third signal is based upon the at least one received acoustic pressure wave for the audio message. Typically, the audio message includes a spoken message by the individual. The audio message may be spoken contemporaneously with the capturing of a sequence of images of the individual, so that a resulting visual message can be synchronized therewith. Alternatively, the audio message may be spoken at a different time than that for capturing the images. Regardless, one is capable of forming a message which comprises an audio message and a visual message associated therewith, based upon both the at least one image produced by the individual and the selected one of the predetermined images.

As a further option, the method may include a step of displaying at least one combined image based upon the at least one image of the individual and the selected image, as indicated by block 20. This step allows the individual to preview the message which is to be transmitted to the wireless pager. Each of the at least one combined image may comprise a corresponding one of the at least one image of the individual superimposed on the selected image. Alternatively, each of the at least one combined image may comprise a first predetermined region and a second predetermined region, wherein the selected image is displayed in the first predetermined region and each of the at least one image of the individual is displayed in the second predetermined region. Regardless, the at least one combined image may be successively displayed to provide an animated display of the individual.

As indicated by block 22, the method further includes a step of transmitting a signal based upon the first signal and the second signal. The signal may be transmitted to a centrally-located paging computer via a standard telephone connection (either wireless or landline). Upon receiving the signal, the paging computer transmits a radio frequency paging signal, modulated in dependence upon the first signal and the second signal, to the wireless pager. As a result, the visual message formed using the above-described method is transmitted to the wireless pager.

Alternatively, the signal which is transmitted in block 22 may already be a radio frequency signal modulated by the first signal and the second signal. Various modulation techniques may be employed, as one with ordinary skill in the art of communications will recognize. Examples of such modulation techniques include, but are not limited to: amplitude modulation, frequency modulation, phase modulation, pulse amplitude modulation, pulse code modulation, pulse width modulation, pulse position modulation, pulse width modulation, time-division modulation, and frequency division modulation. The radio frequency signal may be directly transmitted to the wireless pager, or alternatively, may be indirectly transmitted to the wireless pager via an intermediate location, such as a paging service provider or a repeater. Generally, the intermediate location is one which receives the radio frequency signal and transmits a second radio frequency signal based thereupon to the wireless pager.

If the language-based message, containing either an audio message or alphanumeric message, is to be included, then the transmitted signal is further based upon the third signal produced in block 16.

Figure 2:
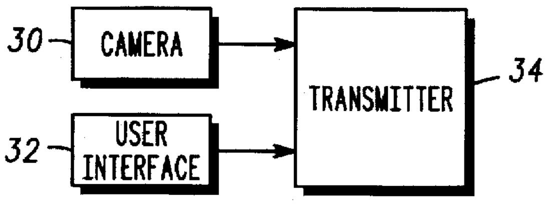
FIG. 2 is a block diagram of an embodiment of a system for forming a message for transmission to a wireless pager.

FIG. 2 is a block diagram of an embodiment of a system for forming a message for transmission to a wireless pager. The system comprises a camera 30 which captures at least one image of an individual, and produces a first signal representative of the at least one image. The camera 30 may be embodied by one of various devices known in the art; these devices include, but are not limited to: a charge-coupled device (CCD) array, or a vidicon. The camera 30 may capture a single still image of the individual, or alternatively, a sequence of images which provide an animated display of the individual when viewed in succession.

The first signal produced by the camera 30 is preferably either an analog or a digital representation of pixels which form the at least one image of the individual. If the digital representation is utilized, the camera 30 may include a digitizer (not specifically illustrated) which provides the first signal in a digital form. The digital form is preferred in that further image processing hardware, such as an image compressor (not specifically illustrated), may be included to reduce the number of bits required to represent the at least one image.

The system further comprises a user interface 32 which allows the individual to select an image from a plurality of predetermined images. Generally, the user interface 32 may include an input device such as one or more buttons, a keyboard, a mouse, a joystick, a lightpen, a trackball, a touchpad, or a touchscreen, to name a few. In a first preferred embodiment, the user interface 32 includes an array of buttons which allows the individual to select the image by performing a series of keystrokes. In a second preferred embodiment, the individual scans through the predetermined images, by pressing an increment button and/or a decrement button contained in the user interface 32, until the desired image is selected.

The user interface 32 produces a second signal which indicates the image which is selected by the individual. The second signal is preferably a designator of the selected image from the plurality of predetermined images. More preferably, the designator comprises a series of bits which uniquely identifies each of the predetermined images.

Further included in the system is a transmitter 34 which is responsive to both the camera 30 and the user interface 32. The transmitter 34 transmits the visual message in the form of a third signal based upon the first signal and the second signal. The transmitter 34 may include a modulator which produces the third signal modulated in dependence upon the first signal and the second signal, For example, the transmitter 34 may include a radio frequency modulator which produces a radio frequency signal modulated in dependence upon the first signal and the second signal. This would be beneficial for a wireless system for transmitting the visual message. Alternatively, the modulator may be of the variety which allows signals to be transmitted over a standard telephone line. This may be used for transmitting the visual message to a centrally-located paging computer.

Figure 3:
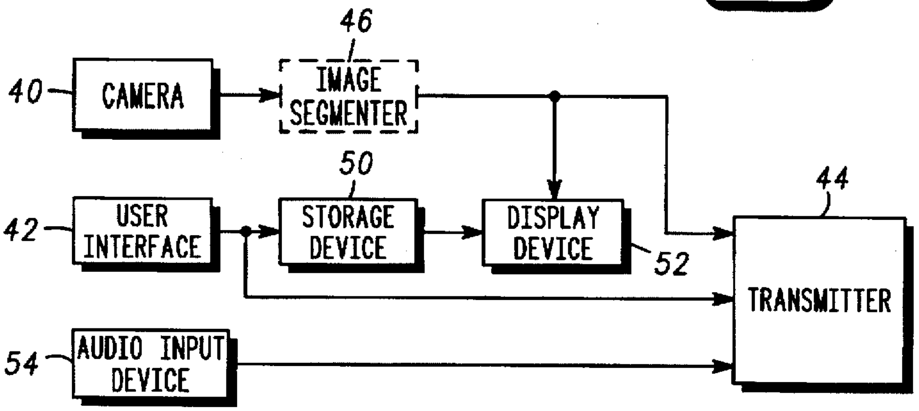
FIG. 3 is a block diagram of another embodiment of a system for forming a message for transmission to a wireless pager.

FIG. 3 is a block diagram of another embodiment of a system for forming a message for transmission to a wireless pager. The system comprises a camera 40, a user interface 42, and a transmitter 44 as in the embodiment of FIG. 2. Optionally, an image segmenter 46 is included in the system. The image segmenter 46 extracts a predetermined object from the at least one image captured by the camera 40. Preferably, the predetermined object includes a portion of the individual, such as the individual's face.

The system further includes an electronic storage device 50 which contains the plurality of predetermined images in an electronic form. The electronic storage device 50 retrieves the selected image of the predetermined images based upon the second signal produced by the user interface 42. The electronic storage device 50 may be a read-only memory, a random-access memory, a magnetic storage device, or a like device. The electronic storage device 50 may be fixed within the system, or may be removable from the system to allow for different predetermined sets of images to be utilized.

A display device 52 is coupled to the camera 40 and the electronic storage device 50 to display at least one combined image based upon the at least one image of the individual and the selected image of the predetermined images. The display device 52 preferably comprises a liquid crystal display (LCD) having a pixel resolution sufficient for displaying the combined image. Alternatively, other display devices may be employed as one with ordinary skill in the art will recognize. By including the display device 52, the individual is able to preview the visual message which is to be transmitted to the wireless pager.

As another option, the system may include an audio input device 54 which produces an audio signal based upon an acoustic pressure wave received thereby. Typically, the acoustic pressure wave is a spoken message produced by the individual. The audio input device 54 may be embodied by a microphone or a like transducer. The audio input device 54 is coupled to the transmitter 44 so that the transmitted signal is further based upon the audio signal.

As a further option, the user interface 42 may allow the individual to enter an alphanumeric message which augments the visual message. The alphanumeric message can be entered by a series of keystrokes performed by the individual, for example. The user interface 42 converts the alphanumeric message to an electrical signal for application to the transmitter 44, which produces the transmitted signal based thereupon.

The embodiment of FIG. 3 may be realized using a standard videophone. Here, the camera 40, the user interface 42 (a numeric key pad on the videophone may be employed as the user interface 42), the transmitter 44, and the display device 52 are contained within the videophone. A mouthpiece of the videophone may be employed as the optional audio input device 54. The at least one image captured by the camera 40 is transmitted by the videophone to a centrally-located paging computer. The second signal representative of the selected image is transmitted by the videophone using DTMF (dual-tone modulated frequency) signals generated by the numeric key pad. The electronic storage device 50 containing the predetermined images may be located at either the paging computer or the videophone. The at least one combined image, formed either by the paging computer or the videophone, may be displayed on the display device 52 to allow for previewing of the visual message.

Figure 4:
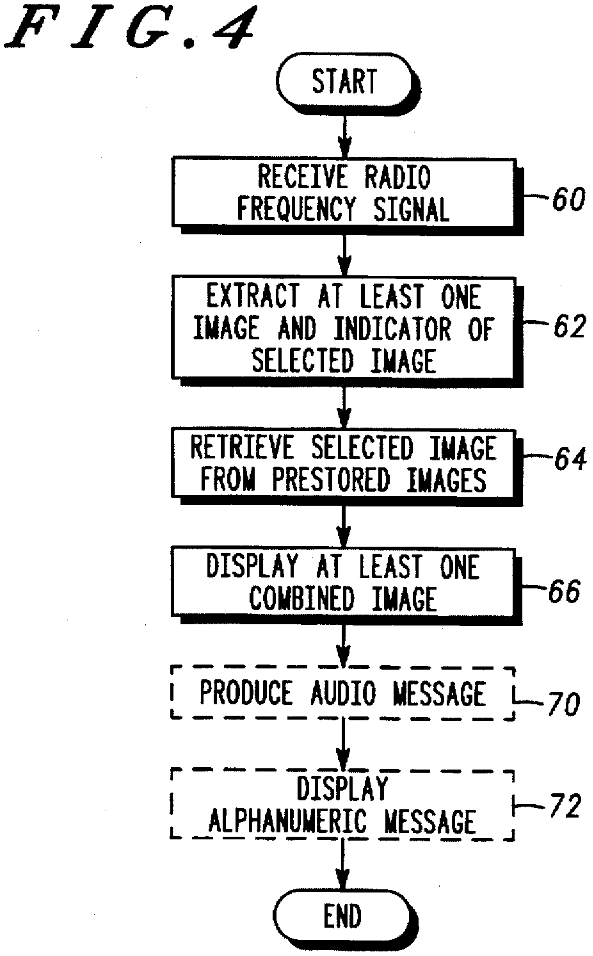
FIG. 4 is a flow chart of an embodiment of a method of reconstructing a message in a wireless pager.

FIG. 4 is a flow chart of an embodiment of a method of reconstructing a message in a wireless pager. As indicated by block 60, the method includes a step of receiving a radio frequency signal which contains a first signal representative of at least one image of an individual and a second signal indicative of a selected image of a plurality of predetermined images. The radio frequency signal may be transmitted by a paging service provider, using a ground antenna or a satellite, in response to receiving a visual paging message. As one having ordinary skill in the art will recognize, the radio frequency signal typically contains an identification signal which identifies which wireless pager is to receive the message.

The method further includes a step of extracting the first signal and the second signal from the radio frequency signal, as indicated by block 62. If the radio frequency signal is modulated in dependence upon the first signal and the second signal, this step entails demodulating the radio frequency signal to extract the first signal and the second signal. The first signal is preferably either an analog or a digital representation of the pixels of the at least one image of the individual. The second signal is preferably a designator of a selected image of a plurality of prestored images. Most preferably, the second signal comprises a series of digital bits which uniquely identifies each of the prestored images.

A step of retrieving the selected image from the prestored images based upon the second signal is performed, as indicated by block 64. Preferably, this step results in providing a digital representation of pixels contained in the selected image.

As indicated by block 66, a step of displaying at least one combined image based upon the at least one image of the individual and the selected image is performed. If the first signal is a compressed, digital signal, the step of displaying includes a step of decompressing the first signal. Each of the at least one combined image may comprise a corresponding one of the at least one image of the individual superimposed on the selected image. Alternatively, each of the at least one combined image may comprise a first predetermined region and a second predetermined region, wherein the selected image is displayed in the first predetermined region and each of the at least one image of the individual is displayed in the second predetermined region. Regardless, the at least one combined image may be successively displayed to provide an animated display of the individual.

Optionally, if the radio frequency signal contains a signal representative of an audio message, then a further step of producing at least one acoustic pressure wave representative of the audio message may be performed, as indicated by block 70. Here, the at least one combined image may be displayed in synchronization with the at least one acoustic pressure wave, so that the visual message and the audio message are synchronized.

As another option, if the radio frequency signal contains a signal representative of an alphanumeric message, then a further step of displaying the alphanumeric message may be performed, as indicated by block 72.

Figure 5:
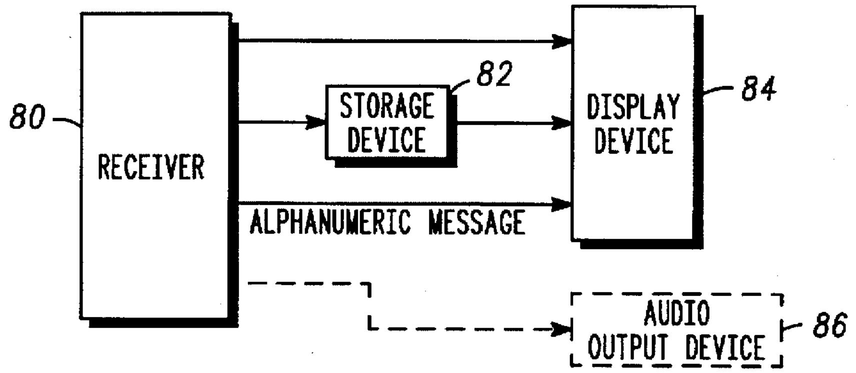
FIG. 5 is a block diagram of an embodiment of a system for reconstructing a message in a wireless pager.

FIG. 5 is a block diagram of an embodiment of a system for reconstructing a message in a wireless pager. A receiver 80 receives a radio frequency signal which contains a first signal representative of at least one image of an individual and a second signal indicative of a selected image of a plurality of predetermined images. Further, the radio frequency signal typically contains an identification signal which identifies which wireless pager is to receive the message. Hence, the wireless pager typically includes hardware responsive to the identification signal for detecting which messages are to be reconstructed therein.

If the radio frequency signal is modulated in dependence upon the first signal and the second signal, then the receiver may include a demodulator (not specifically illustrated), as is known in the art. The demodulator acts to extract the first signal and the second signal from the radio frequency signal based upon a predetermined modulation scheme which is utilized.

The receiver 80 provides the second signal to an electronic storage device 82 which contains the predetermined images in an electronic form. The electronic storage device 82 retrieves the selected image of the predetermined images based upon the second signal. The electronic storage device 82 may include a readonly memory, a random-access memory, a magnetic storage device, or a like device. The electronic storage device 82 may be fixed within the wireless pager, or may be removable to allow for different predetermined sets of images to be utilized.

The first signal from the receiver 80 and the selected image from the electronic storage device 82 are communicated to a display device 84. The display device 84 displays at least one combined image based upon the at least one image of the individual and the selected image. The display device 84 may be capable of successive displaying a series of combined images to provide an animated display of the individual. Alternatively, the display device 84 may only display a single combined image based upon a still image of the individual. The display device 84 preferably comprises a liquid crystal display (LCD) having a pixel resolution sufficient for displaying the at least one combined image. Alternatively, other display devices may be employed as one with ordinary skill in the art will recognize.

More preferably, the display device 84 has sufficient pixel resolution so that the image of the individual may be recognized by the recipient of the visual message. Further, the display device 84 is preferably capable of displaying a sufficient number of different pixel intensity levels and/or colors so that the image of the individual may be recognized.

Optionally, if the radio frequency signal contains a signal representative of an audio message, the system may further include an audio output device 86 which produces at least one acoustic pressure wave representative of the audio message. Here, the receiver 80 extracts the signal representative of the audio message from the radio frequency signal for application to the audio output device 86. The audio output device 86 may include a speaker or any like transducer capable of producing acoustic pressure waves in response to an electrical signal applied thereto.

The at least one combined image may be displayed in synchronization with the at least one acoustic pressure wave so that the visual message and the audio message are synchronized. For example, a sequence of combined images may be successively displayed to correspond with a spoken message from the individual.

Optionally, if the radio frequency signal contains a signal representative of an alphanumeric message, then the display device 84 may further display the alphanumeric message in addition to the at least one combined image. Here, the receiver 80 extracts the signal representative of the alphanumeric message for application to the display device 84.

Although not specifically illustrated, the system for reconstructing the message may be used in conjunction with other hardware contained within a wireless pager. The wireless pager may include a memory for storing received messages, and a user interface which allows a user to step through received messages for display on the display device 84. In order to store the visual messages, the memory may store pixel representations of the combined images. Alternatively, the memory may store representations of the first and second signals; e.g., the memory stores pixel representations of the image of the individual and the designator of the selected image.

Figure 6:
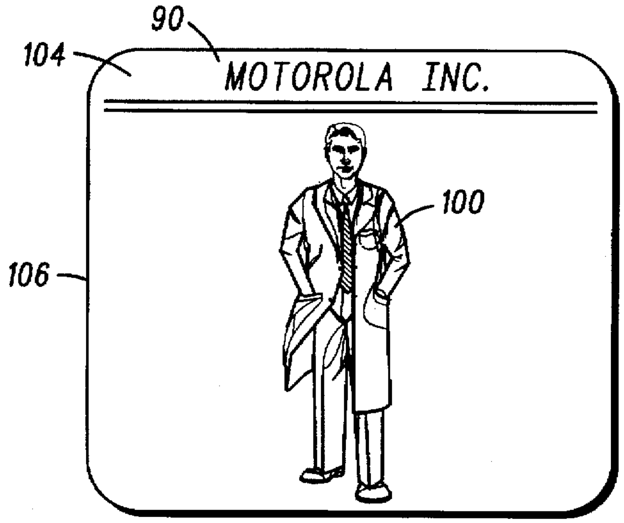
Figure 7:
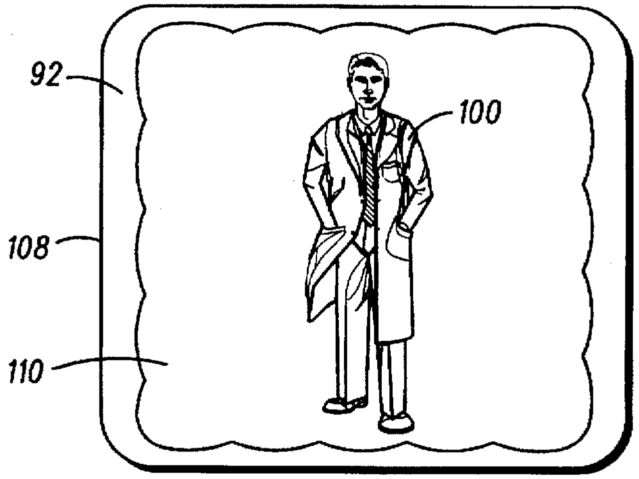

FIGS. 6–10 schematically illustrate examples of combined images in accordance with embodiments of the present invention. Examples of the prestored, predetermined clip art images include: a letter-head image 90, an example of which is illustrated in FIG. 6; a border image 92, an example of which is illustrated in FIG. 7; a graphics image 94, an example of which is illustrated in FIG. 8; a scenic image 96, an example of which is illustrated in FIG. 9; and a message-slip image 98, an example of which is illustrated in FIG. 10. An image 100 of the individual is included in each of the examples of combined images.

If the individual forming the visual paging message is representing a business or a personal concern, he/she may choose a suitable letter-head image 90 or a like image to form the visual message. The letter-head image 90 may graphically contain the name of the business or personal concern.

The individual may select a suitable border image 92 or graphics image 94 to embellish the visual paging message. If the individual forming the visual paging message is on vacation, for example, he/she may choose a suitable scenic image 96 or a like image to form the visual message. The scenic image 96, and more generally any of the clip-art images, may be captured by a camera and/or artistically created.

The individual may select the message-slip image 98 to provide a conventional "while you were out" type visual message. Here, various message-slips may be selected having different illustrations which characterize the message. For example, different message-slips may contain characterizations such as "urgent", "personal", "call back", and "will call again". The message-slip image 98 may include fields which allow an alphanumeric message entered by the individual to be displayed.

As earlier described, the image 100 of the individual may be superimposed on the selected clip-art image to form the combined image. This is illustrated in FIG. 8 and FIG. 9 wherein the image 100 is superimposed on the graphics image 94 and the scenic image 96. Alternatively, the image 100 may be displayed in one predetermined region, while the selected clip-art image is displayed in another predetermined region. This is illustrated in FIGS. 6, 7, and 10. In FIG. 6, the letter-head image 90 is displayed in a region 104 above another region 106 which contains the image 100 of the individual. In FIG. 7, the border image 92 is displayed in a region 108 which surrounds another region 110 containing the image 100 of the individual. In FIG. 10, the image 100 of the individual is contained in a predetermined region 112 in the message-slip image 98.

A multitude of different clip-art images may be utilized to personalize a visual message in embodiments of the present invention. Other clip-art images which may be popular include greeting-card-type images for various occasions and sports-highlights images. Consequently, embodiments of the present invention may be applied in a variety of applications which include paging, greetings, and visual mail.

Thus, there has been described herein a concept, as well as several embodiments including a preferred embodiment of a wireless pager with prestored images.

Because the various embodiments of methods and systems for forming and reconstructing a visual message as herein-described utilize a prestored clip art image along with a captured image, they provide a significant improvement in personalizing a visual message which is transmitted to a wireless pager.

Additionally, the various embodiments of the present invention as herein-described use clip art images to characterize the nature of the paging message, such as being urgent or personal.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

We claim:

1. A system for forming a message for a wireless pager, the system comprising:

a camera which captures at least one image, the camera producing a first signal representative of the at least one image;

a user interface which allows an individual to select a selected image from a plurality of predetermined images, the user interface producing a second signal which indicates the selected image; and a transmitter, in communication with the camera and the user interface, which transmits a third signal based upon the first signal and the second signal;

a display device in communication with the camera; and a storage device which contains the plurality of predetermined images, the storage device communicating with the user interface to retrieve the selected image based upon the second signal, wherein the selected image is communicated to the display device, and wherein the display device displays at least one combined image based upon the at least one image and the selected image.

2. The system of claim 1 wherein the third signal is a radio frequency signal modulated in dependence upon the first signal and the second signal.

3. The system of claim 1 wherein each of the at least one combined image has a corresponding one of the at lease one image of the individual superimposed on the selected image.

4. The system of claim 1 wherein the selected image is displayed in a first predetermined region of each of the at least one combined image, and each of the at least of one image of the individual is displayed in a second predetermined region of the at least one combined image.

5. The system of claim 1 wherein the plurality of predetermined images includes a plurality of clip art images.

6. The system of claim 1 further comprising an audio input device which produces a fourth signal in dependence upon at least one acoustic pressure wave received thereby, wherein the third signal transmitted by the transmitter is further based upon the fourth signal.

7. A system for forming a message for a wireless pager, the system comprising:

a camera which captures at least one image, the camera producing a first signal representative of the at least one image;

a user interface which allows an individual to select a selected image from a plurality of predetermined images, the user interface producing a second signal which indicates the selected image;

a transmitter, in communication with the camera and the user interface, which transmits a third signal based upon the first signal and the second signal; and an image segmenter which extracts a predetermined object from the at least one image, the predetermined object including at least a portion of an individual.

8. A system for forming a message for a wireless pager, the system comprising:

a camera which captures at least one image of an individual;

an image segmenter which extracts a predetermined object from each of the at least one image of the individual, the image segmenter producing a first signal representative of the predetermined object;

a user interface which allows the individual to select a selected image of a plurality of predetermined images, the user interface producing a second signal which indicates the selected image;

a storage device which contains the plurality of predetermined images, the storage device communicating with the user interface to retrieve the selected image based upon the second signal;

a display device in communication with the image segmenter and the storage device, the display device displaying at least one combined image based upon the predetermined object and the selected image; and a transmitter, responsive to the camera and the user interface, which transmits a radio frequency signal modulated in dependence upon the first signal and the second signal.

9. A method of forming a message for a wireless pager, the method comprising the steps of:

capturing at least one image of an individual;

producing a first signal representative of at least a portion of the at least one image of the individual;

producing a second signal which indicates a selected image from a plurality of predetermined images;

transmitting a third signal based upon the first signal and the second signal; and displaying at least one combined image based on the at least one image of the individual and the selected image.

10. The method of claim 9 further comprising a step of producing a fourth signal in dependence upon at least one acoustic pressure wave received, wherein the third signal is further based upon the fourth signal.

11. The method of claim 9 wherein the third signal is a radio frequency signal modulated in dependence upon the first signal and the second signal.

12. The method of claim 9 further comprising a step of displaying the at least one image of the individual for viewing by the individual.

13. The method of claim 9 wherein the at least one combined image is displayed for viewing by the individual.

14.The method of claim 13 wherein each of the at least one combined image has a corresponding one of the at least one image of the individual superimposed on the selected image.

15. The method of claim 13 wherein the selected image is displayed in a first predetermined region of each of the at least one combined image, and each of the at least one image of the individual is displayed in a second predetermined region of the at least one combined image.

16. The method of claim 9 wherein the plurality of predetermined images includes a plurality of clip art images.

17. A method of forming a message for a wireless pager, the method comprising the steps of:

capturing at least one image of an individual;

producing a first signal representative of at least a portion of each of the at least one image of the individual;

producing a second signal which indicates a selected image from a plurality of predetermined images;

transmitting a third signal based upon the first signal and the second signal; and segmenting the at least one image of the individual to extract a predetermined object, wherein the predetermined object includes at least a portion of the individual.

18. A method of forming a message for a wireless pager, the method comprising the steps of:

capturing at least one image of an individual;

extracting a predetermined object from the at least one image;

producing a first signal representative of the predetermined object;

producing a second signal which indicates a selected image from a plurality of predetermined images;

retrieving the selected image based upon the second signal;

displaying a combined image based upon the predetermined object and the selected image; and transmitting a radio frequency signal modulated in dependence upon the first signal and the second signal.

19. A system for reconstructing a message in a wireless pager, the system comprising:

a receiver which receives a radio frequency signal, the radio frequency signal containing a first signal representative of at least one image of an individual and a second signal indicative of a selected image of a plurality of predetermined images;

a storage device which contains the plurality of predetermined images, the storage device in communication with the receiver to retrieve the selected image based upon the second signal; and a display device which communicates with the receiver and the storage device, the display device displaying at least one combined image based upon the at least one image and the selected image;

wherein the radio frequency signal contains a third signal representative of an alphanumeric message, and wherein the at least one combined image is further based upon the alphanumeric message.

20. The system of claim 19 wherein each of the at least one combined image has a corresponding one of the at least one image of the individual superimposed on the selected image.

21. The system of claim 19 wherein the radio frequency signal contains a third signal representative of an audio message, the system further comprising an audio output device which produces at least one acoustic pressure wave representative of the audio message based upon the third signal.

22. The system of claim 21 wherein the at least one combined image is displayed in synchronization with the at least one acoustic pressure wave representative of the audio message.

23. The system of claim 19 wherein the plurality of predetermined images includes a plurality of clip art images.

24. The system of claim 19 wherein the at least one combined image is successively displayed to provide a display of the individual.

25. A system for reconstructing a message in a wireless pager, the system comprising:

a receiver which receives a radio frequency signal, the radio frequency signal containing a first signal representative of at least one image of an individual and a second signal indicative of a selected image of a plurality of predetermined images;

a storage device which contains the plurality of predetermined images, the storage device in communication with the receiver to retrieve the selected image based upon the second signal;

a display device which communicates with the receiver and the storage device, the display device displaying at least one combined image based upon the at least one image and the selected image; and wherein the selected image is displayed in a first predetermined region of each of the at least one combined image, and each of the at least one image of the individual is displayed in a second predetermined region of the at least one combined image.

26. A method of reconstructing a message received by a wireless pager, the method comprising the steps of:

receiving a radio frequency signal which contains a first signal representative of at least one image of an individual and a second signal indicative of a selected image of a plurality of prestored images;

extracting the first signal and the second signal from the radio frequency signal;

retrieving the selected image of the plurality of prestored images based upon the second signal;

displaying at least one combined image based upon the at least one image and the selected image; and displaying the at least one combined image to provide a display of the individual.

27. The method of claim 26 wherein each of the at least one combined image has a corresponding one of the at least one image of the individual superimposed on the selected image.

28. The method of claim 26 wherein the selected image is displayed in a first predetermined region of each of the at least one combined image, and each of the at least one image of the individual is displayed in a second predetermined region of the at least one combined image.

29. The method of claim 26 wherein the radio frequency signal contains a third signal representative of an audio message, the method further comprising a step of producing at least one acoustic pressure wave representative of the audio message based upon the third signal.

30. The method of claim 29 wherein the at least one combined image is displayed in synchronization with the at least one acoustic pressure wave representative of the audio message.

31. The method of claim 26 wherein the radio frequency signal contains a third signal representative of an alphanumeric message, the method further comprising a step of displaying the alphanumeric message.

32. The method of claim 26 wherein the plurality of predetermined images includes a plurality of clip art images.

33. A system for forming a message for a wireless pager, the system comprising:

a camera which captures at least one image;

a user interface that allows a user to select a image from a plurality of predetermined images;

a storage device that contains the plurality of predetermined images:

a display device that displays at least one combined image based upon the at least one image and the selected image; and a transmitter responsive to the camera.

34. A system for reconstructing a message in a wireless pager comprising:

a receiver that receives a radio frequency signal containing a first signal representative of at least one image of an individual, a second signal indicative of a selected image of a plurality of predetermined images, and a third signal representative of an alphanumeric message; and a display device that displays a combined image based upon the at least one image of the individual, the selected image, and the alphanumeric message.

* * * * *

UNITED STATES PATENT AND TRADEMARK OFFICE

CERTIFICATE OF CORRECTION

PATENT NO. : 5,701,258

DATED : Dec. 23, 1997

INVENTOR(S) : Daryl R. Harris, Shrirang N. Jambhekar, William L. Reber, Bruce E. Stuckman, Cary D. Perttunen It is certified that error appears in the above-indentified patent and that said Letters Patent is hereby corrected as shown below:

Claim 3, line 45
"lease one" should read --least one--

Claim 33, line 64
"select a image" should read --select an image--

Signed and Sealed this

Third Day of March, 1998

*Attest:*

Bruce Lehman

BRUCE LEHMAN

*Attesting Officer*

*Commissioner of Patents and Trademarks*